(12) United States Patent
Jeong

(10) Patent No.: US 12,199,536 B2
(45) Date of Patent: Jan. 14, 2025

(54) MOTOR DRIVING SYSTEM AND METHOD FOR CONTROLLING SAME

(71) Applicant: HYUNDAI MOBIS CO., LTD., Seoul (KR)

(72) Inventor: Hyeon Hee Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 112 days.

(21) Appl. No.: 17/988,137

(22) Filed: Nov. 16, 2022

(65) Prior Publication Data
US 2023/0188071 A1 Jun. 15, 2023

(30) Foreign Application Priority Data
Dec. 13, 2021 (KR) .................. 10-2021-0177628

(51) Int. Cl.
*H02P 27/08* (2006.01)
*H02P 21/22* (2016.01)

(52) U.S. Cl.
CPC .............. *H02P 21/22* (2016.02); *H02P 27/08* (2013.01)

(58) Field of Classification Search
CPC ........... H02P 21/22; H02P 27/08; H02P 21/05
See application file for complete search history.

(56) References Cited

U.S. PATENT DOCUMENTS

| | | | | |
|---|---|---|---|---|
| 7,667,426 B2* | 2/2010 | Jeong | ................... | B60L 15/025 318/400.07 |
| 8,269,441 B2* | 9/2012 | Morimoto | ........... | H02P 21/0089 318/400.14 |
| 10,351,002 B2* | 7/2019 | Saha | .................. | B60L 3/04 |
| 2004/0100220 A1* | 5/2004 | Fu | ............... | B60L 15/00 318/700 |
| 2005/0140329 A1* | 6/2005 | Ihm | ................. | H02P 21/06 318/712 |
| 2014/0203754 A1* | 7/2014 | Bhangu | ................. | H02P 21/12 318/702 |
| 2015/0381081 A1* | 12/2015 | Bhangu | ................. | H02P 23/14 318/400.05 |
| 2018/0191283 A1* | 7/2018 | Aoyagi | ................ | H02P 21/0089 |

FOREIGN PATENT DOCUMENTS

KR 10-2016-0007850 A 1/2016

* cited by examiner

*Primary Examiner* — Rina I Duda
(74) *Attorney, Agent, or Firm* — NSIP Law

(57) ABSTRACT

A motor driving system includes an energy storage device storing direct current power for driving a motor, an inverter including a plurality of switching elements to transform the direct current power stored in the energy storage device into alternating current power and to provide the alternating current power to the motor, and a controller performing pulse width modulation control on the plurality of switching elements of the inverter. The controller generates a voltage command of the motor based on a difference between a current command of the motor and a motor current actually provided to the motor, changes the voltage command within an operation region when the generated voltage command deviates from a preset operation region, and performs flux weakening control for generating the current command such that a difference between the voltage command before the change and the voltage command after the change becomes minimum.

9 Claims, 4 Drawing Sheets

MOTOR DRIVING SYSTEM AND METHOD FOR CONTROLLING SAME

CROSS-REFERENCE TO RELATED APPLICATION

The present application claims priority to Korean Patent Application No. 10-2021-0177628, filed on Dec. 13, 2021, the entire contents of which are incorporated herein for all purposes by this reference.

BACKGROUND

Technical Field

The present disclosure relates generally to a motor driving system and, more particularly, to a motor driving system to which an overmodulation technique for strengthening noise, vibration and harshness (NVH) performance, and a flux weakening control technique that is strong against disturbance components are applied.

Description of the Background

Generally, a motor driving system includes a power storage device (e.g., a battery), and an inverter that converts direct current (DC) power stored in the power storage device into alternating current (AC) power for driving a motor.

Here, the inverter includes a plurality of switching elements. These switching elements are controlled by a pulse width modulation (PWM) mode, and thereby can generate the AC power. The AC power generated by the inverter is provided to the motor, so that the motor is driven.

A minimum distance overmodulation technique or an in-phase overmodulation technique is applied to conventional motor driving systems. The minimum distance overmodulation technique or the in-phase overmodulation technique is a technique for converting a voltage command vector using hexagonal sides, i.e. 6-step operation regions, determined by DC voltage that is input into the inverter in a d-q vector space when a voltage command vector deviates from an operation region of the motor driving system.

The minimum distance overmodulation technique or the in-phase overmodulation technique applied in the past has a problem in that, since the voltage command vector is converted by the 6-step operation regions through overmodulation, there is a problem in that a senary torque ripple is generated based on an electrical angle, and thus noise, vibration, and harshness (NVH) performance is reduced.

Further, application is made to a method of generating the d-q current command vector based on a linear interpolation method using a map that is previously made for flux weakening control on a maximum load condition during the flux weakening control performed when high output is required.

In this flux weakening control technique applied to the conventional motor driving system, operation of a logic requested to generate the current command is complicated, and an amount of operation is much, so that a software load factor can be increased. For this reason, a lot of time and expense are taken to optimize a code for reducing the software load factor, and a d-axis current command vector is generated using a q-axis current. As a result, coupling is generated between the d-axis and q-axis currents, and thus causes a problem in that this method is not strong against disturbance components.

The foregoing is intended merely to aid in the understanding of the background of the present disclosure, and is not intended to mean that the present disclosure falls within the purview of the related art that is already known to those skilled in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Accordingly, the present disclosure has been made keeping in mind the above problems occurring in the related art, and the present disclosure is intended to propose a motor driving system to which an overmodulation technique for strengthening noise, vibration and harshness (NVH) performance, and a flux weakening control technique that is strong against disturbance components are applied.

The objective of the present disclosure is not limited to the aforementioned description, and other objectives not explicitly disclosed herein will be clearly understood by a person having ordinary skill in the art from the description provided hereinafter.

In one general aspect, a motor driving system includes: an energy storage device configured to store direct current power for driving a motor; an inverter including a plurality of switching elements that are configured to transform the direct current power stored in the energy storage device into alternating current power and to provide the alternating current power to the motor; and a controller configured to perform pulse width modulation control on the plurality of switching elements of the inverter, wherein the controller generates a voltage command of the motor based on a difference between a current command of the motor and a motor current actually provided to the motor, changes the voltage command within an operation region when the generated voltage command deviates from a preset operation region, and performs flux weakening control for generating the current command such that a difference between the voltage command before the change and the voltage command after the change becomes minimum.

The operation region may be an operation region to which a space vector pulse width modulation mode is applied based on direct current voltage provided from the energy storage device to the inverter.

The operation region may be an interior of a circle having a radius of $V_{DC}/\sqrt{3}$ from an origin in d-q synchronous coordinates (where $V_{DC}$ is a direct current voltage of the motor).

The controller may change the operation region using a value corresponding to a point at which the vector corresponding to the voltage command before the change meets a circumference of the circle in the d-q synchronous coordinates.

The controller may generate a d-axis current command when performing the flux weakening control according to:

$$i_d^{r*} = i_{d,T}^{r*} - \frac{\omega_c}{s+\omega_c}\left(\alpha_d R_s \Delta v_d^r + \alpha_q \omega_r L_s \Delta v_q^r\right)$$

where $i_d^{r*}$ is a d-axis current command, $i_{dT}^{r*}$ is a current command determined based on the torque command, $\omega_c$ is a cutoff frequency of a lowpass filter which is determined based on a gain of the controller applied when performing the current control of the motor, $R_s$ is a resistance value of a stator of the motor, $L_s$ is an inductance value of the stator of the motor, $$\alpha_d = \frac{1}{R_s^2}, \alpha_q = \frac{1}{\omega_{r\_max}^2 L_s^2},$$

and $\Delta v_d^r$ and $\Delta v_q^r$ are a d-axis component and a q-axis component of a difference between the voltage command before being changed into the operation region and the voltage command changed into the operation region.

The controller may generate a q-axis current command when performing the flux weakening control based on:

$$i_q^* = \frac{i_q^{r*}}{|i_q^{r*}|} \min\left(|i_q^{r*}|, \sqrt{I_s^2 - i_d^{r*2}}\right)$$

where $I_s$ is a maximum value of a three-phase current of the motor.

The controller may include: a current control unit configured to generate the voltage command for minimizing an error between the current command and the motor current; a voltage limit unit configured to change the voltage command using the operation region when the voltage command deviates from the operation region to which the space vector pulse width modulation mode is applied; and a flux weakening control unit configured to generate the current command when performing the flux weakening control of the motor so as to minimize a difference between the voltage command before being changed by the voltage limit unit and the voltage command after being changed by the voltage limit unit.

The flux weakening control unit may be configured to: determine a torque command based current command, which is preset and input based on the torque command of the motor, to be the current command when the flux weakening control of the motor is not performed; and change the torque command based current command to generate the current command such that, when the flux weakening control of the motor is performed, a difference between the voltage command before being changed by the voltage limit unit and the voltage command changed by the voltage limit unit becomes minimum.

In an embodiment of the present disclosure, the flux weakening control unit may generate the d-axis current command when performing the flux weakening control based on:

$$i_d^{r*} = i_{d,T}^{r*} - \frac{\omega_c}{s + \omega_c}(\alpha_d R_s \Delta v_d^r + \alpha_q \omega_r L_s \Delta v_q^r),$$

where $i_d^{r*}$ is a d-axis current command, $i_{d,T}^{r*}$ is a current command determined based on the torque command, $\omega_c$ is a cutoff frequency of a lowpass filter which is determined based on a gain of the controller applied when performing the current control of the motor, $R_s$ is a resistance value of a stator of the motor, $L_s$ is an inductance value of the stator of the motor, $$\alpha_d = \frac{1}{R_s^2}, \alpha_q = \frac{1}{\omega_{r\_max}^2 L_s^2},$$

and $\Delta v_d^r$ and $\Delta v_q^r$ are a d-axis component and a q-axis component of a difference between the voltage command before being changed into the operation region and the voltage command changed into the operation region.

The flux weakening control unit may generate the q-axis current command when performing the flux weakening control based on:

$$i_q^{r*} = \frac{i_q^{r*}}{|i_q^{r*}|} \min\left(|i_q^{r*}|, \sqrt{I_s^2 - i_d^{r*2}}\right),$$

where $I_s$ is the maximum value of the three-phase current of the motor.

A method of controlling the motor driving system of the present disclosure includes: generating, by the controller, the voltage command of the motor based on the difference between the current command of the motor and the motor current actually provided to the motor; changing, by the controller, the voltage command within the operation region when the generated voltage command deviates from the preset operation region; and performing, by the controller, the flux weakening control for generating the current command such that the difference between the voltage command before the change and the voltage command after the change becomes minimum.

According to the motor driving system, by applying the voltage vector limit overmodulation technique, the voltage command deviating from the operation region is changed into the operation region of the space vector pulse width modulation, so that it is possible to suppress generation of an electrical angle basis senary torque ripple from the minimum distance overmodulation technique or the in-phase overmodulation technique.

Further, according to the motor driving system, by generating a current command for flux weakening control through real-time operation in a way of minimizing a difference between a voltage command, which is determined based on a difference between a motor current command and a motor current actually provided to a motor, and a voltage command, which is changed into an operation region of the space vector pulse width modulation by overmodulation, separate map data for performing flux weakening control is not required, and a complicate operation algorithm for linear interpolation is not requested, so that the system can be simplified.

In addition, according to the motor driving system, by first generating a d-axis current command through real-time operation in a way of minimizing a difference between the voltage commands before and after overmodulation when generating a current command for the flux weakening control, the d-axis current command is prevented from being coupled with the q-axis current command, so that a system more robust against disturbance can be constructed.

Other features and aspects will be apparent from the following detailed description, the drawings, and the claims.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, motor driving systems according to various embodiments will be described in greater detail with reference to the attached drawings.

Figure 1:
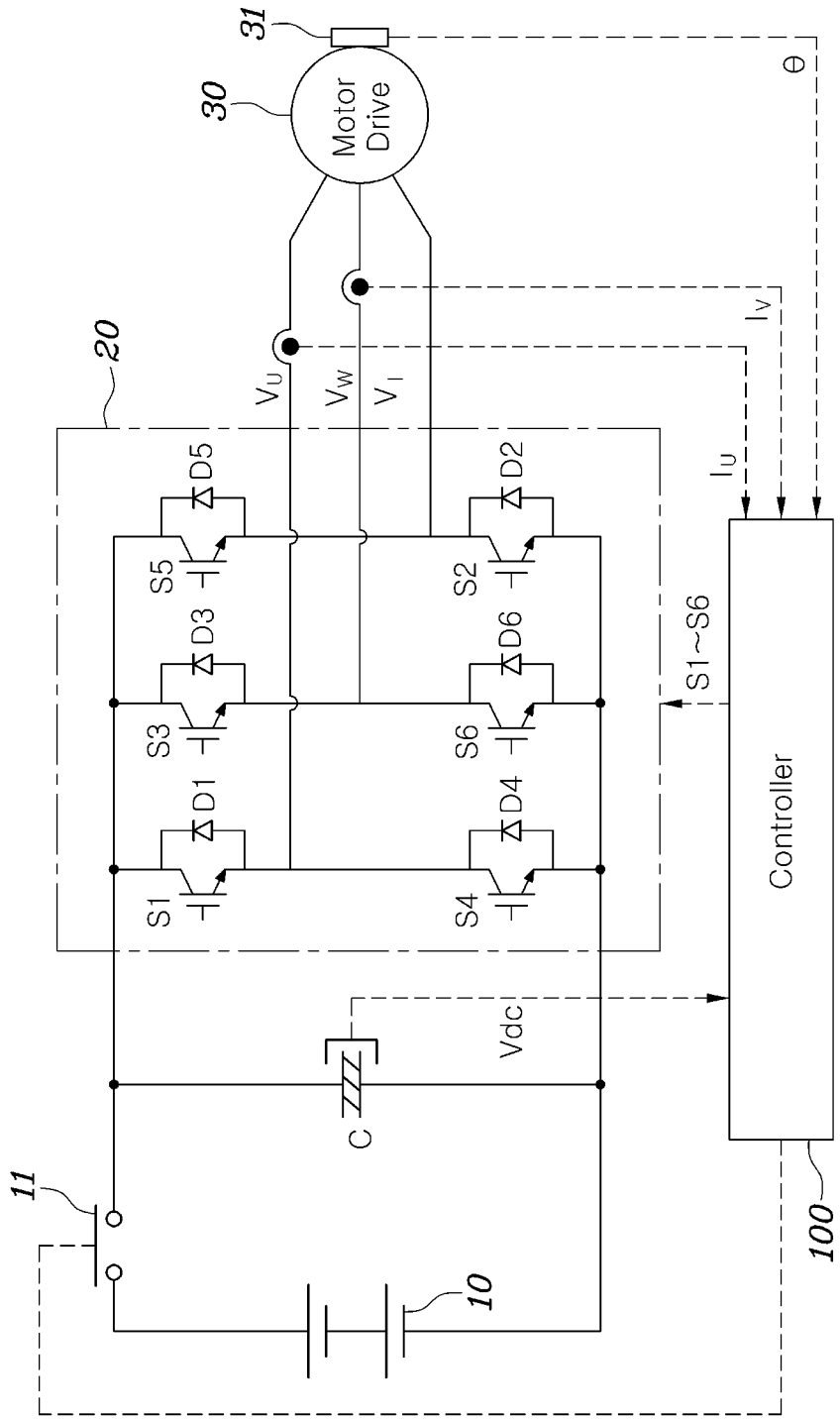
FIG. 1 is a circuit diagram of a motor driving system according to an embodiment of the present disclosure.

FIG. 1 is a circuit diagram illustrating a motor driving system according to an embodiment of the present disclosure.

Referring to FIG. 1, a motor driving system according to an embodiment of the present disclosure can be configured to include an energy storage device 10, an inverter 20, a motor 30, a rotational angle sensor 31, and a controller 100.

The energy storage device 10 is an element such as a battery, etc. that stores electric energy for driving the motor 30 in the form of a direct current, and can provide direct current power to an input stage of an inverter 13.

The inverter 13 serves as an element for converting direct current power, which is stored in and provided from the energy storage device 10, into alternating current power for driving the motor, and can include a plurality of switching elements S1 to S6, on/off states of which are controlled by pulse width modulation signals provided from the controller 100.

The motor 30 is an element for receiving 3-phase alternating current power provided from the inverter 20 and generates a rotational force, and various kinds of motors known in the art may be employed. For example, the motor 30 may be applied to a steering driving motor applied to a motor driven power steering (MDPS) system in a vehicle, or a motor that provides a rotational force to drive wheels of an eco-friendly vehicle.

The rotational angle sensor 31 is an element for detecting a position of a rotor of the motor, i.e. a rotational angle of the rotor of the motor, detects an angle of the rotor of the motor 30, and can continuously output rotational angle detection signals including information about the detected rotational angle of the rotor. For example, the rotational angle sensor 31 may be implemented as a resolver, or the like.

The controller 100 can basically perform control based on a pulse width modulation mode that properly adjusts a duty cycle (a duty ratio) of each of the switching elements S1 to S6 of the inverter 20 in order to control torque of the motor 30 at a desired value. For this control, the controller 100 samples signals provided from the rotational angle sensor 31 and values (Iu, Iv) obtained by detecting a current provided to the motor 30 at a specific point in time, and derives information related to the torque of the motor 30 that is being driven at present based on the sampled values.

Further, based on a result obtained by comparing a torque command value of the motor 30 which is input from the outside (a torque target value to be obtained through the motor 30) with the information related to the torque of the motor 30 that is being driven at present based on the sampled values, the controller 100 controls the switching elements S1 to S6 in the inverter 20 so as to enable the motor 30 to output a value corresponding to the torque command value.

Particularly, the motor driving system according to an embodiment of the present disclosure can perform flux weakening control by: generating a motor current command and a motor voltage command based on a difference between motor voltage and current actually provided to the motor; applying a voltage vector limit overmodulation technique to change the motor voltage command when the generated voltage command deviates from a preset operation region; and generating a current command such that a difference between the motor voltage command generated based on a difference between the motor current command and the motor current actually provided to the motor and the changed motor voltage command becomes minimum.

In greater detail, the motor driving system according to an embodiment of the present disclosure applies a voltage vector limit overmodulation technique to change a voltage command vector deviating from an operation region into an operation region of space vector pulse width modulation, thereby can suppress an electrical angle based senary torque ripple that can be generated at a minimum distance overmodulation technique or an in-phase overmodulation technique that changes the voltage command vector using a 6-step operation region.

Further, the motor driving system according to an embodiment of the present disclosure generates a current command for flux weakening control in a way of minimizing a difference between a voltage command vector, which is determined based on a difference between voltage command vectors before and after overmodulation, that is, a difference between a motor current command and a motor current actually provided to a motor, and a voltage command vector, which is changed into an operation region of space vector pulse width modulation by overmodulation, thereby can simplify the system because separate map data for performing the flux weakening control is not required, and a complicate operation algorithm for linear interpolation is not required.

In addition, a d-axis current command is first generated in a way of minimizing a difference between voltage command vectors before and after overmodulation when a current command for flux weakening control is generated, thereby preventing a d-axis current command from being coupled with a q-axis current command, so that it is possible to construct a system that is more strong against disturbance.

Figure 2:
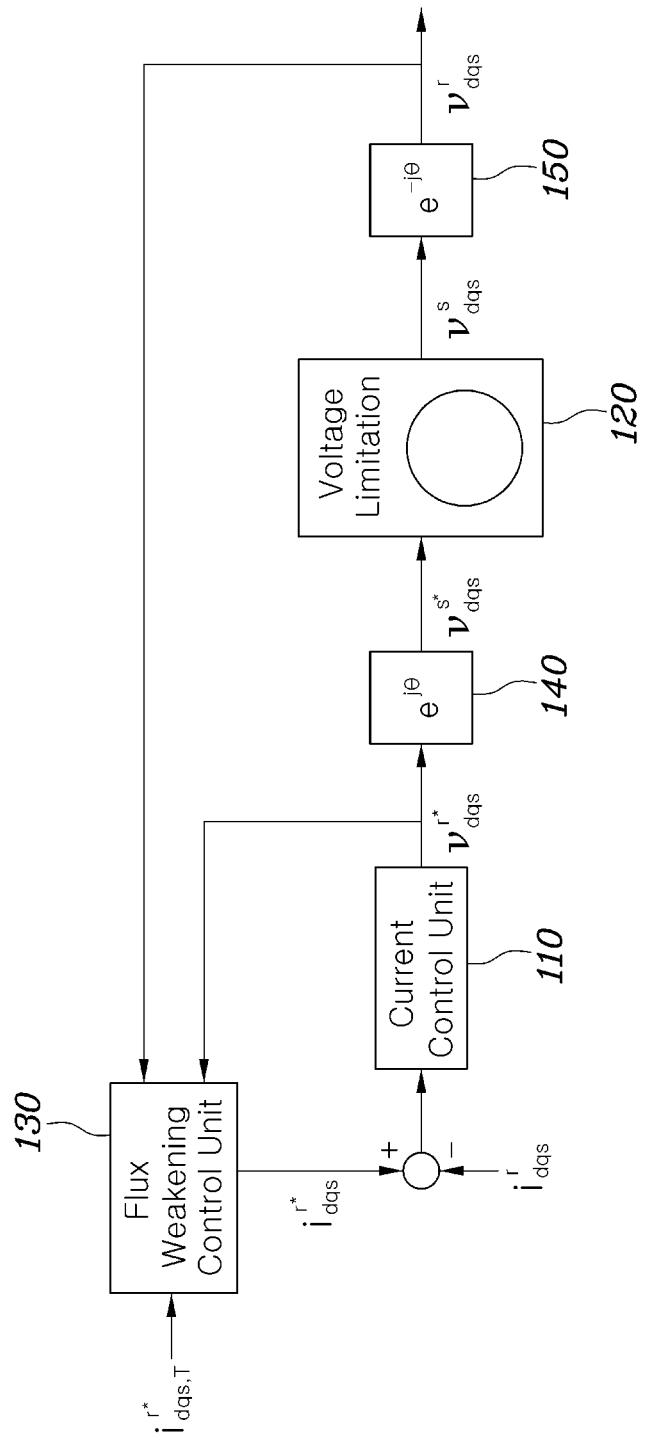
FIG. 2 is a block configuration diagram illustrating a controller of the motor driving system according to an embodiment of the present disclosure in greater detail.

FIG. 2 is a block configuration diagram illustrating a controller of the motor driving system according to an embodiment of the present disclosure in greater detail.

Referring to FIG. 2, a controller 100 of the motor driving system according to an embodiment of the present disclosure can be configured to include: a current control unit 110 that derives a voltage command $v_{dqs}^{r*}$ for minimizing an error between a current command $i_{dqs}^{r*}$ and an actual current $i_{dqs}^{r*}$ of a motor; a voltage limit unit 120 that changes the voltage command $v_{dqs}^{r*}$ by an operation region of space vector pulse width modulation when the voltage command $v_{dqs}^{r*}$ deviates from the operation region of space vector pulse width modulation, and generates a new voltage command $v_{dqs}^{r}$, and a flux weakening control unit 130 that generates the current command so as to minimize a difference between the voltage command $v_{dqs}^{r*}$ input into the voltage limit unit 120 and the voltage command $v_{dqs}^{r}$ changed by the voltage limit unit 120.

The current control unit 110 can generate the voltage command $v_{dqs}^{r*}$ that receives an error between the current command $i_{dqs}^{r*}$ and the actual current $i_{dqs}^{r*}$ of the motor and can minimize or remove the error. The current control unit 110 may be implemented as a controller that applies a well-known control technique suitable for the system, such as proportional integral control or proportional derivative control that is typically applied to a feedback control technology field.

The voltage limit unit 120 changes the voltage command into the operation region when the voltage command $v_{dqs}^{r*}$ output from the current control unit 110 deviates from a preset operation region, and can generate a new voltage command $v_{dqs}^{r}$.

Figure 3:
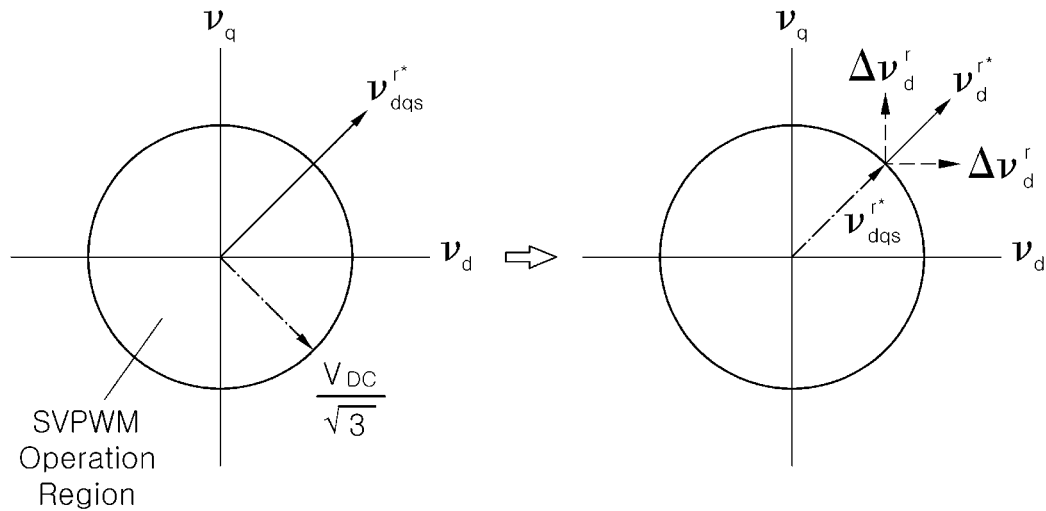
FIG. 3 is a view illustrating an operation region on d-q stationary coordinates for explaining examples of operations of a voltage limit unit in the motor driving system according to an embodiment of the present disclosure.

FIG. 3 is a view illustrating an operation region on d-q stationary coordinates for explaining examples of operations of a voltage limit unit in the motor driving system according to an embodiment of the present disclosure.

As illustrated on the left side of FIG. 3, the operation region of the space vector pulse width modulation (SVPWM) on d-q stationary coordinates can be the inside of a circle, a radius of which is obtained by a value that divides an input direct current voltage $V_{DC}$ of an inverter generating a three-phase voltage for the purpose of driving the motor by $\sqrt{3}$, and the voltage command $v_{dqs}^{r*}$ output from the current control unit 110 can be determined as a value beyond the operation region. The input direct current voltage $V_{DC}$ of the inverter is a voltage converted into a three-phase alternating current by the inverter, and can be typically expressed as a direct current voltage of the motor.

As illustrated on the right side of FIG. 3, the voltage limit unit 120 converts the voltage command $v_{dqs}^{r*}$, which deviates from the operation region, into a value corresponding to one point on a circumference of a circle corresponding to the operation region, and can determine a point at which the vector corresponding to the voltage command $v_{dqs}^{r*}$ meets the circle corresponding to the operation region, to be a new voltage command $v_{dqs}^{r}$. The overmodulation technique limiting a voltage in this way is referred to as a voltage vector limit overmodulation technique.

The minimum distance overmodulation technique or the in-phase overmodulation technique used in the past converted the voltage command deviating from the operation region using a 6-step operation region having an operation region indicated by a hexagon having apexes distant from an origin of the d-q stationary coordinates by a size of "$2V_{DC}/3$". The minimum distance overmodulation technique is a technique that converts the voltage command deviating from the operation region into the nearest hexagonal side, and the in-phase overmodulation technique is a technique that converts the voltage command deviating from the operation region into a point at which the voltage command vector meets the hexagon.

The conventional minimum distance overmodulation technique or the conventional in-phase overmodulation technique generates a senary torque ripple based on the electrical angle at the converted voltage command, and can reduce noise, vibration, and harshness (NVH) performances of the motor.

In contrast, the motor driving system according to an embodiment of the present disclosure, as described above, converts the voltage command deviating from the operation region onto a circumference having a radius of $V_{DC}/\sqrt{3}$ in the d-q stationary coordinates. For this reason, it is possible to prevent the senary torque ripple component from being generated at the converted voltage command, and to prevent a drop in the NVH performance of the motor.

Meanwhile, the current command $i_{dqs}^{r*}$ of the motor can be determined by a torque requirement (a torque command) of the motor which is determined by request of a user of the motor when the flux weakening control is not performed. The torque command of the motor applies preset map data, and can be changed into a current command corresponding to the preset map data. A technique for generating the torque command and the resultant current command is a technique well-known in the art, and additional detailed description will be omitted.

When the flux weakening control is performed, the flux weakening control unit 130 can determine the current command of the motor so as to have a minimum difference in the voltage command before and after voltage limit for performing the overmodulation is performed.

That is, in FIG. 2, when the flux weakening control is not performed, the flux weakening control unit 130 can output the current command $i_{dqs,T}^{r*}$, which is preset and input based on the torque command of the motor, into the current command $i_{dqs}^{r*}$ without a change. When the flux weakening control is performed, the flux weakening control unit 130 changes the torque command based current command $i_{dqs,T}^{r*}$ such that a difference in the voltage command before and after the voltage limit for performing the overmodulation is performed becomes minimum, and can generate the current command $i_{dqs}^{r*}$.

The flux weakening control unit 130 can generate the current command such that a difference in the voltage command before and after the voltage limit is performed becomes minimum as follows.

First, as illustrated on the right side of FIG. 3, a d-axis component $\Delta v_d^r$ and a q-axis component $\Delta v_q^r$ of the difference between the voltage command $v_{dqs}^{r*}$ before the voltage limit is performed and the voltage command $v_{dqs}^{r}$ after the voltage limit is performed can be determined as in Equation 1 below.

$$\approx \Delta v_d^r = v_d^{r*} - v_d^r \approx R_s i_d^r - \omega_r L_s i_q^r - v_d^r$$

$$\approx \Delta v_q^r = v_q^{r*} - v_q^r \approx R_s i_q^r + \omega_r L_s i_d^r - v_q^r \qquad \text{[Equation 1]}$$

In Equation 1, $v_d^{r*}$ and $v_q^{r*}$ are respectively the d-axis and q-axis components of the voltage command before the voltage limit, $v_d^r$ and $v_q^r$ are respectly the d-axis and q-axis components of the voltage command after the voltage limit. Further, $R_s$ is the resistance value of the stator of the motor, $L_s$ is the inductance value of the stator of the motor, and $\omega_r$ is the rotational speed of the rotor of the motor. Further, $i_d^r$ and $i_q^r$ are the currents of the motor. Equation 1 can be derived when considering a steady state in which there is no change in the component of magnetic flux in a voltage equation of the motor. The resistance value of the stator of the motor and the inductance value of the stator of the motor are values determined when the motor is designed. The rotational speed of the rotor of the motor can be derived based on the rotational angle of the motor rotor which is detected by the rotational angle sensor 31 installed on the motor.

At this time, to minimize a magnitude of the difference between the voltage vectors before and after the voltage limit for the overmodulation, an object function J as in Equation 2 below can be determined.

$$J = 1/2(\alpha_d \Delta v_d^{r2} + \alpha_q \Delta v_q^{r2}) \qquad \text{[Equation 2]}$$

In Equation 2 above, $\alpha_d$ and $\alpha_q$ can be defined as Equation 3 below.

$$\alpha_d = \frac{1}{R_s^2} \quad \text{[Equation 3]}$$

$$\alpha_q = \frac{1}{\omega_{r\_max}^2 L_s^2}$$

In Equation 3 above, $\omega_{r\_max}$ is the maximum operation speed of the motor.

Next, Equation 4 below can be derived using Gradient descent method.

$$\Delta i_d^{r*} = \frac{\omega_c}{s + \omega_c} VJ \quad \text{[Equation 4]}$$

In Equation 4, $\Delta i_d^{r*}$ is an variation of the d-axis current command for minimizing a difference in size of the voltage command vector before and after the voltage limit, and $\omega_c$ is a cutoff frequency of a lowpass filter, and is known as being set using a gain of each of the proportional controller and the integral controller which constitute the current control unit 110. For example, the cutoff frequency $\omega_c$ can be determined by a value obtained by dividing an integral gain $k_i$ by a proportional gain $k_p$.

Solving Equation 4, the d-axis current command can be obtained as Equation 5 below.

$$i_d^{r*} - i_{d,T}^{r*} = -\frac{\omega_c}{s+\omega_c}\left(\alpha_d \Delta v_d^r \frac{\partial}{\partial i_d^r}\Delta v_d^r + \alpha_q \Delta v_q^r \frac{\partial}{\partial i_d^r}\Delta v_q^r\right) \quad \text{[Equation 5]}$$

$$i_d^{r*} = i_{d,T}^{r*} - \frac{\omega_c}{s+\omega_c}\left(\alpha_d R_s \Delta v_d^r + \alpha_q \omega_r L_s \Delta v_q^r\right)$$

In Equation 5, $i_{d,T}^{r*}$ indicates the current command determined based on the torque command.

The flux weakening control unit 130 can determine the d-axis current command $i_d^{r*}$ using Equation 5 based on a difference between the value input into the voltage limit unit 120 and the value output from the voltage limit unit 120. In this way, the motor driving system according to one embodiment of the present disclosure can derive the d-axis current command through direct computation during the flux weakening control without coupling with the q-axis current command, and thus the motor driving system can be implemented to be strong against disturbance components.

Further, as indicated in Equation 5 above, in one embodiment of the present disclosure, the d-axis current command $i_d^{r*}$ can be simply implemented by errors $\Delta v_d^r$ and $\Delta v_q^r$ between the d-axis and q-axis voltage commands input into the voltage limit unit 120 and between the d-axis and q-axis voltage commands converted by the voltage limit unit 120, the rotational speed $\omega_r$ of the rotor of the motor that has already been used to control the rotational speed of the motor, the resistance $R_s$ and inductance $L_s$ of the rotor which are the factors determined when the motor is designed, a product of constants $\alpha_d$ and $\alpha_q$, and filtering $$\frac{\omega_c}{s+\omega_c}.$$

That is, it is possible to lower complexity of the control logic for performing the flux weakening control, reduce a computation amount, and thus reduce a software load.

Meanwhile, the flux weakening control unit 130 can obtain a maximum value of the q-axis current command derived through Equation 5 above, and finally obtain the q-axis current as in Equation 6 below by reflecting this maximum value.

$$i_q^{r*} = \frac{i_q^{r*}}{|i_q^{r*}|}\min\left(|i_q^{r*}|, \sqrt{I_s^2 - i_d^{r*2}}\right) \quad \text{[Equation 6]}$$

In Equation 6 above, $I_s$ indicates a maximum value of a three-phase current of the motor, and may correspond to a rated current of a typical motor. A maximum value of the sum of the d-axis and q-axis current vectors cannot be greater than $I_s$, the maximum value of the q-axis current is obtained through a term of $\sqrt{I_s^2 - i_d^{r*2}}$, and the q-axis current command does not exceed the maximum value of the q-axis current through a term of $\min(|i_q^{r*}|, \sqrt{I_s^2 - i_d^{r*2}})$.

In FIG. 3, reference numerals 140 and 150 indicate coordinates transform units that transform the voltage command from synchronous coordinates to stationary coordinates and that again transform the voltage command from the stationary coordinates to the synchronous coordinates, and separate detailed description thereof will be omitted because of application of the transform mode that is already well-known to the technical field of the art. In addition, the actual current of the motor which is input into a comparator at a front stage of the current control unit 110 can be derived by detecting the currents Iu and Iv of the phases provided to the motor, and performing d-q transformation on them. This also belongs to the technique that is already well-known to the technical field to which the present disclosure belongs, and thus separate description thereof will be omitted.

Figure 4:
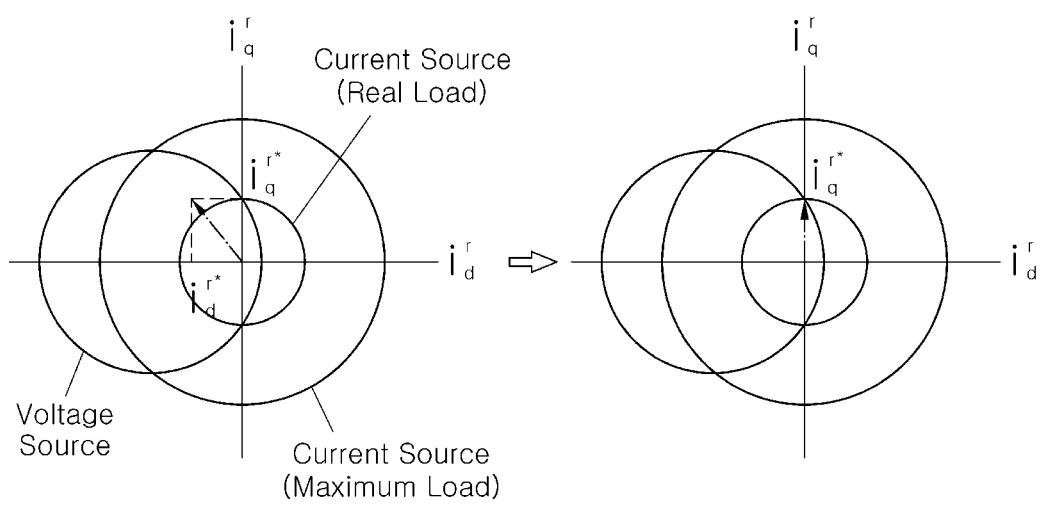
FIGS. 4 and 5 are views obtained by comparison between a current command generating technique of a conventional flux weakening control technique and a current command generating technique of a flux weakening control technique applied to the motor driving system according to an embodiment of the present disclosure.
Figure 5:
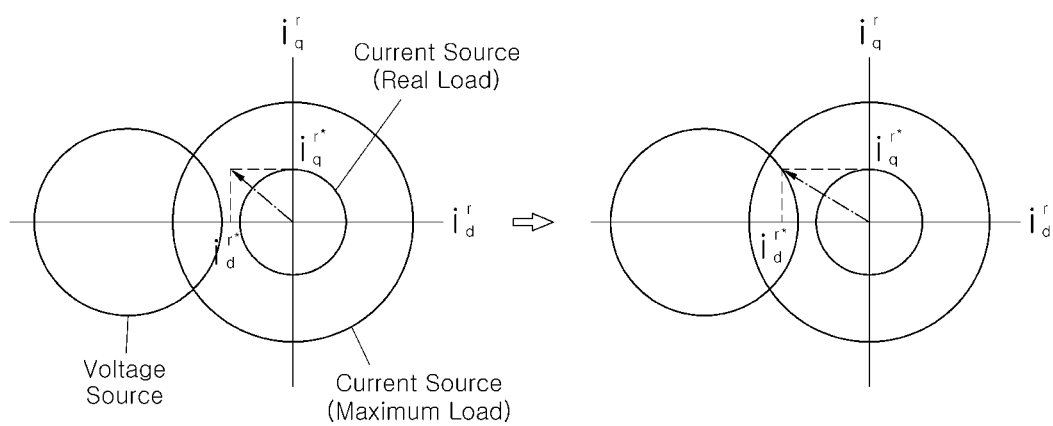

FIGS. 4 and 5 are views obtained by comparison between a current command generating technique of a conventional flux weakening control technique and a current command generating technique of a flux weakening control technique applied to the motor driving system according to an embodiment of the present disclosure. In FIGS. 4 and 5, the left sides illustrate a mode in which the current command is determined by a conventional flux weakening control technique, and the right sides illustrate a mode in which the current command is determined during the flux weakening control in the motor driving system according to an embodiment of the present disclosure.

FIG. 4 is to compare modes in which the current command is determined on a low load condition during middle and high speed operations. As illustrated in the left side of FIG. 4, in the past, a phase angle for the flux weakening control is determined according to a mode coupled to the q-axis current command, i.e. according to a motor speed. For this reason, in a situation where a point at which a current source and a voltage source meet is determined on the q-axis and thus the d-axis current is not needed, the phase angle is applied to the q-axis current command, and thereby an unnecessary d-axis current command is generated. This generates a senary torque ripple of the motor, which can lower NVH performances.

In contrast, as illustrated in the right side of FIG. 4, the motor driving system according to an embodiment of the present disclosure generates the d-axis current command through real-time computation. For this reason, the d-axis current can be determined to be zero (0) in a situation where the d-axis current is not needed, so that an NVH lowering problem resulting from generation of the unnecessary d-axis current command is inevitable.

FIG. 5 is to compare modes in which the current command is determined on a low load condition during a high speed operation. As illustrated in the left side of FIG. 5, in the past, a phase angle is applied to the q-axis current command, and thereby the q-axis current command is determined. For this reason, in a case where a current source and a voltage source are not met, the d-axis current becomes short, and a situation in which control is impossible may occur.

In contrast, as illustrated in the right side of FIG. 5, the motor driving system according to an embodiment of the present disclosure generates the q-axis current command through real-time computation, and thus the maximum value of the d-axis current command is determined. For this reason, the necessary d-axis current command is generated, and the motor can be controlled.

Although the exemplary embodiments of the present disclosure have been described for illustrative purposes, it will be apparent to those having ordinary skill in the art that various modifications and variations are possible, without departing from the scope and spirit of the present disclosure as disclosed in the accompanying claims.

What is claimed is:

1. A motor driving system comprising:
an energy storage device configured to store direct current power for driving a motor;
an inverter including a plurality of switching elements that are configured to transform the direct current power stored in the energy storage device into alternating current power and to provide the alternating current power to the motor; and
a controller configured to perform pulse width modulation control on the plurality of switching elements of the inverter,
wherein the controller is further configured to generate a voltage command of the motor based on a difference between a current command of the motor and a motor current actually provided to the motor, change the voltage command within an operation region when the generated voltage command deviates from a present operation region, and perform flux weakening control for generating the current command such that a difference between the voltage command before the change and the voltage command after the change becomes minimum,
wherein the operation region is an operation region to which a space vector pulse width modulation mode is applies based on direct current voltage provided from the energy storage device to the inverter, such that the operation region is an interior of a circle having a radius of $V_{DC}/\sqrt{3}$ from an origin in d-q synchronous coordinates, where $V_{DC}$ is a direct current voltage of the motor.

2. The motor driving system according to claim 1, wherein the controller is further configured to change the operation region using a value corresponding to a point at which a vector corresponding to the voltage command before the change meets a circumference of the circle in the d-q synchronous coordinates.

3. The motor driving system according to claim 1, wherein the controller is further configured to generate a d-axis current command when performing the flux weakening control based on:

$$i_d^{r*} = i_{d,T}^{r*} - \frac{\omega_c}{s+\omega_c}(\alpha_d R_s \Delta v_d^r + \alpha_q \omega_r L_s \Delta v_q^r),$$

where $i_d^{r*}$ is a d-axis current command, $i_{d,T}^{r*}$ is a current command determined based on a torque command, $\omega_c$ is a cutoff frequency of a lowpass filter which is determined based on a gain of the controller applied when performing the current control of the motor, $R_s$ is a resistance value of a stator of the motor, $L_s$ is an inductance value of the stator of the motor, $$\alpha_d = \frac{1}{R_s^2},$$

$$\alpha_q = \frac{1}{\omega_{r\_max}^2 L_s^2},$$

and $\Delta v_d^r$ and $\Delta v_q^r$ are a d-axis component and a q-axis component of a difference between the voltage command before being changed into the operation region and the voltage command changed into the operation region.

4. The motor driving system according to claim 3, wherein the controller generates a q-axis current command when performing the flux weakening control based on:

$$i_q^{r*} = \frac{i_q^{r*}}{|i_q^{r*}|}\min\left(|i_q^{r*}|, \sqrt{I_s^2 - i_d^{r*2}}\right),$$

where $I_s$ is a maximum value of a three-phase current of the motor.

5. The motor driving system according to claim 1, wherein the controller comprises:
a current control unit configured to generate the voltage command for minimizing an error between the current command and the motor current;
a voltage limit unit configured to change the voltage command using the operation region when the voltage command deviates from the operation region to which the space vector pulse width modulation mode is applied; and
a flux weakening control unit configured to generate the current command when performing the flux weakening control of the motor so as to minimize a difference between the voltage command before being changed by the voltage limit unit and the voltage command after being changed by the voltage limit unit.

6. The motor driving system according to claim 5, wherein the flux weakening control unit is configured to:
determine a torque command based current command, which is preset and input based on a torque command of the motor, to be the current command when the flux weakening control of the motor is not performed; and
change the torque command based current command to generate the current command such that, when the flux weakening control of the motor is performed, a difference between the voltage command before being changed by the voltage limit unit and the voltage command changed by the voltage limit unit becomes minimum.

7. The motor driving system according to claim 5, wherein the flux weakening control unit is further configured to generate a d-axis current command when performing the flux weakening control based on:

$$i_d^{r*} = i_{d,T}^{r*} - \frac{\omega_c}{s+\omega_c}(\alpha_d R_s \Delta v_d^r + \alpha_q \omega_r L_s \Delta v_q^r),$$

where $i_d^{r*}$ is the d-axis current command, $i_{d,T}^{r*}$ is a current command determined based on a torque command, $\omega_c$ is a cutoff frequency of a lowpass filter which is determined based on a gain of the controller applied when performing the current control of the motor, $R_s$ is a resistance value of a stator of the motor, $L_s$ is an inductance value of the stator of the motor, $$\alpha_d = \frac{1}{R_s^2}, \alpha_q = \frac{1}{\omega_{r\_max}^2 L_s^2},$$

and $\Delta v_d^r$ and $\Delta v_q^r$ are a d-axis component and a q-axis component of a difference between the voltage command before being changed into the operation region and the voltage command changed into the operation region.

8. The motor driving system according to claim 7, wherein the flux weakening control unit is further configured to generate a q-axis current command when performing the flux weakening control based on:

$$i_q^{r*} = \frac{i_q^{r*}}{|i_q^{r*}|}\min\left(|i_q^{r*}|, \sqrt{I_s^2 - i_d^{r*2}}\right),$$

where $I_s$ is a maximum value of the three-phase current of the motor.

9. A method of controlling a motor driving system, the method comprising:
generating, by a controller, a voltage command of a motor based on a difference between a current command of the motor and a motor current actually provided to the motor;
changing, by the controller, the voltage command within an operation region when the generated voltage command deviates from a preset operation region; and
performing, by the controller, flux weakening control for generating the current command such that the difference between the voltage command before the change and the voltage command after the change becomes minimum,
wherein the operation region is an operation region to which a space vector pulse width modulation mode is applied based on direct current voltage provided from the energy storage device to the inverter, such that the operation region is an interior of a circle having a radius of $V_{DC}/\sqrt{3}$ from an origin in d-q synchronous coordinates, where $V_{DC}$ is a direct current voltage of the motor.

* * * * *